Jan. 27, 1970  D. E. WRIGHT  3,491,454
LEVEL VIAL AND METHOD OF SEALING
Filed Feb. 13, 1967
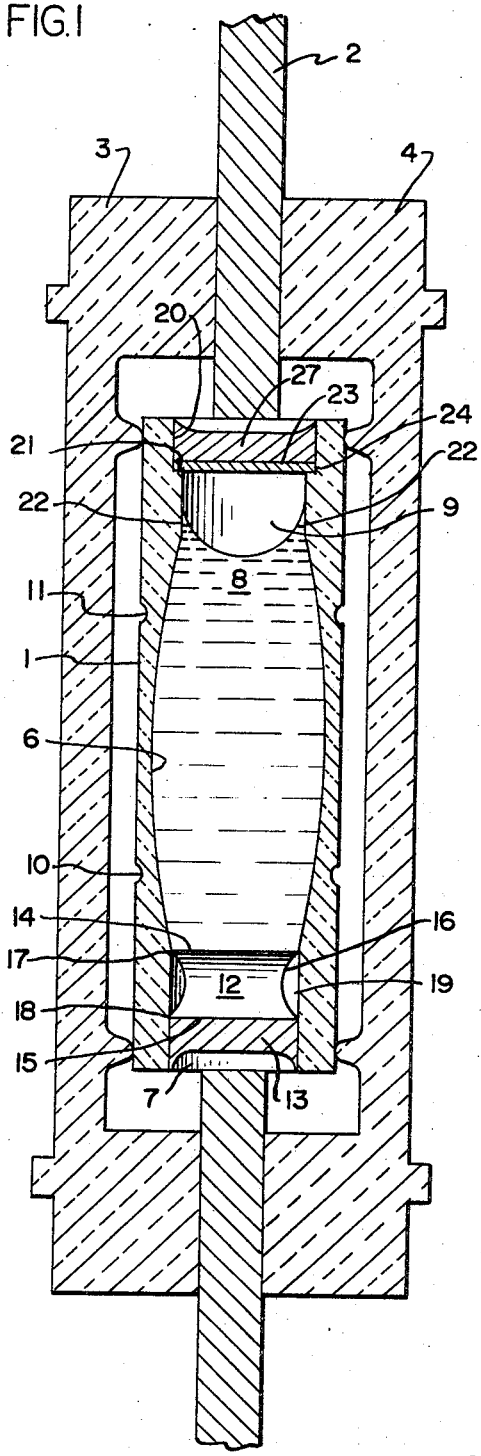
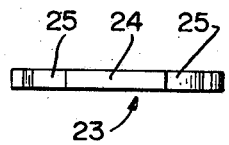
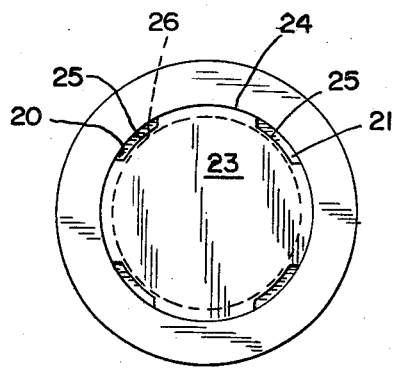
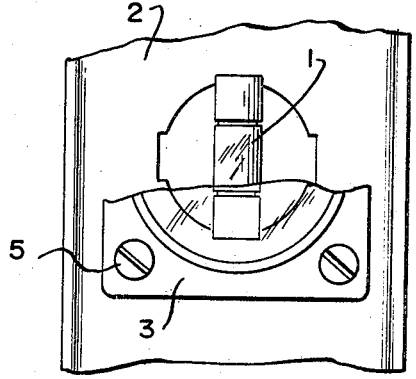
INVENTOR
DONALD E. WRIGHT
BY Pitcherbridge, O'Neill & Ambel
ATTORNEYS United States Patent Office 3,491,454
Patented Jan. 27, 1970

3,491,454
LEVEL VIAL AND METHOD OF SEALING
Donald E. Wright, Box 387, Elm Grove, Wis. 53213
Continuation-in-part of application Ser. No. 377,881,
June 25, 1964. This application Feb. 13, 1967, Ser.
No. 615,514
Int. Cl. G01c 9/24
U.S. Cl. 33—211    4 Claims

ABSTRACT OF THE DISCLOSURE

A level vial having a first fluid seal in direct contact with the fluid contained in the vial and a second or dry seal out of contact with the fluid contained in the vial. The first seal is designed to act as a primary barrier while the second seal is designed to act as a secondary barrier for maintaining the position of the first seal. One embodiment of the primary seal is a spool-shaped member which produces a pair of spaced apart annular line sealing contacts with the vial. Another embodiment of the primary seal is a perforate disc member which permits pressure equalization above the fluid contained in the vial as the member is pressed into the vial opening. The primary seal of this latter embodiment is effected by utilizing a solvent to produce an interstitial seal or bond between the material comprising the disc member and the material comprising the vial to render the primary seal impermeable to the fluid in the vial. An organic adhesive is used in connection with both embodiments to produce the secondary vial seal.

---

This application is a continuation-in-part of my copending application Ser. No. 377,881, now Patent No. 3,311,990 filed June 25, 1964 for Level. As was brought out at length in this application, the level industry has been confronted with problems relating to the high degree of skill required in the final production phases of level instrument manufacture, including relatively slow assembly techniques. This problem was approached and solved by the development of a new level vial and a means for assembling the vial to a suitable frame requiring minimal skills throughout the manufacturing and assembly processes and which materially reduce the time involved in producing a completed level instrument.

Although a wide variety of plastic materials are available as potential level vial stock, acrylic thermoplastic polymers or butyrates such as cellulose acetate butyrate are presently preferred because of their degree of transparency; their dimensional stability under broadly varying conditions; and their workability at high production speeds. The use of plastics for vial material, however, has given rise to problems particularly in the production of reliable, permanently leak-proof bubble chambers.

In the use of tubular plastic stock for vials, it has been found that some plastic materials, when used as end plugs or bubble chamber seals, tend to score or scratch the inner tube surface and thereby provide a potential leakage path for the fluid contained by the vial. Other plastic and plugs or seals have been found to be permeable to hydrocarbon penetration or the penetration by other components of the fluid contained by the vial thereby permitting the partial or total dissipation of the fluid from the vial. Some plastic materials used to seal the fluid containing bubble chambers of plastic level vials have been found to lack sufficient dimensional stability under broadly varying conditions to provide a reliable seal.

Various bonding agents used in permanently anchoring plastic vials and seals or end closures have been found to pose problems similar to those encountered with the different types of plastic seals used. Slow curing and heat production by the bonding agent have been problematic. Dimensional stability has been a particularly troublesome problem in the bonding of plastic seals to plastic tubes. This problem has arisen chiefly as a result of curing shrinkage which occurs in the use of organic adhesives containing a relatively high percentage of evaporative solvents. When such shrinkage occurs, the level vial may become distorted and unsuitable for accurate measurement purposes, or the distortion may cause fluid leakage from the plastic seal.

Additional problems have arisen in the final closure of the bubble chamber of a level vial. Where tubular plastic stock is used in fabricating level vials, after the bubble chamber has been prepared, one end of the tube is sealed utilizing suitable means and the level fluid is introduced into the bubble chamber of the vial. The fluid is added to a level which is preselected to produce the desired position indicating means during use of the vial. In establishing the final vial closure by insertion of a plastic sealing member into the open end of the vial, the combination of capillary action within the vial and the pressure exerted by insertion of an air tight plastic seal into the open end of the fluid filled vial was found to frequently produce elevation of the fluid meniscus around the tubular inner periphery of the vial. The fluid elevation at times reached the sealing zone. This often resulted in the production of incomplete, leaking or unreliable seals.

To overcome the above problems, the level vial closure means and method of the invention have been developed. Several seal or plug embodiments have been developed to serve as plastic vial closure means. One embodiment utilizes a plastic member having a spool shape. The member is designed for insertion in a generally cylindrical opening in an end of the vial. The tolerances of the member and the opening are such that a pair of annular spaced fluid sealing line contacts are formed in the cylindrical opening providing a first wet seal in direct contact with the fluid of the bubble chamber and a second dry seal spaced therefrom by the concave portion of the spool-shaped member. The plug has a hardness level determined relative to the hardness of the vial material. The plug has good dimensional stability and is impervious to hydrocarbons and other level fluid components.

A second plug developed for level vials is formed from a disc which is provided with perforations, preferably formed adjacent the peripheral edge of the disc. This disc is designed to be inserted in a counter-bore opening in the vial. This diameter of this opening generally exceeds that of the adjacent portion of the vial fluid chamber. The disc diameter permits a firm fit of the disc in the counter-bore opening. The diameter of the disc measured between the peripheral perforations is sufficiently great to close the counter-bore above the liquid after it has been brought into contact with the innermost shoulder of the counter-bore. Prior to this pressure equalization between the fluid chamber of the vial adjacent the counter-bore and the exterior of the vial is maintained through the perforations. When this disc is in position, a means is applied to seal the disc with respect to the fluid chamber and the counter-bore. This seal overcomes problems resulting from capillary action and pressure build-up during seal insertion and produces a permanent, reliable wet seal of the fluid chamber of the vial which permits the employment of relatively slow curing organic adhesives as secondary seals.

Finally, the seals of the invention are permanently bonded to the vial producing a dry or secondary seal. The bonding is accomplished utilizing an organic adhesive which is relatively dimensionally stable under broadly varying conditions and is impervious to penetration by components of the vial fluid. The adhesive preferably develops relatively little heat while it is curing.

Various objects and advantages of the invention will hereinafter become more fully apparent from the following description of the drawings illustrating presently preferred embodiments thereof and wherein:

FIG. 1 is a fragmentary sectional view of a portion of a level instrument made in accordance with the invention;

FIG. 2 is a fragmentary top plan view with parts broken away of the central portion of the unit shown in FIG. 1;

FIG. 3 is a cross sectional view taken along lines 3—3 of FIG. 1; and

FIG. 4 is a side elevation of a disc of the invention.

FIGS. 1 and 2 of the drawing illustrate a plastic level vial, generally designated 1, installed in a frame 2 of a level device in accordance with the teachings of my copending application Ser. No. 377,881, filed June 25, 1964 for a Level. As is best seen in FIG. 1, the level vial of the invention is positioned in the plane of the frame between a pair of protective cover plates 3 and 4, which as shown in FIG. 2 are secured to the frame by screws 5.

Referring more particularly to FIG. 1, the vial 1 illustrated therein is elongated along its longitudinal axis and includes a barrel-shaped bore or bubble chamber 6 which is located generally mid-way between the ends of the vial. It has been found to be essential to fabricate the plastic vials from a plastic having a high degree of transparency, dimensional stability under widely varying conditions and workability at high manufacturing speeds. For best results, butyrates, such as cellulose acetate butyrate, are preferred in the production of level vials of the invention.

The lower end of the vial illustrated in FIG. 1 is shown to be fabricated with a generally cylindrical bore 7 which serves to establish communication between the exterior of the vial and the barrel-shaped bore 6. As is shown, barrel-shaped bore 6 contains a liquid 8, such as one of the aliphatic hydrocarbons (commonly known as mineral spirits) or stoddard solvent, to produce a bubble or void 9 in the liquid in the bore. Void 9 acts as a measuring indicia in connection with spaced annular grooves 10 and 11 formed on the outer periphery of the plastic vial 1. The bore 7 acts as a closure passage for hermetically sealing one end of the level vial.

The hermetic seal of the bore 7 is produced by inserting a plug, generally designated 12, into the bore 7. The plug 12 is permanently anchored within bore 7 utilizing an organic adhesive or resinous mass such as an epoxy resin.

The plug 12 is shown in FIGURE 1 to have a spool-shape with a pair of parallel surfaces 14 and 15 aligned at substantially right angles to the longitudinal axis of bore 7. The portion 16 of plug 7 located between the parallel surfaces 14 and 15 is depressed to form an annular concavity therebetween. Plug 12 thereby produces a double generally annular line contact 17 and 18 with the surfaces defining cylindrical bore portion 7 when inserted therein. Surface 14 of the plug and the sealing line contact 17 produced thereby therefore act as a primary liquid or wet seal while surface 15 and the line contact 18 on the opposite side of plug 12 act in conjunction with the resinous mass 13 to produce a secondary or dry seal. The fluid and the resin are separated by an air space or void 19 produced by the annular concavity 16 formed between the sealing surfaces.

Best results have been obtained with the seal of the invention when plugs 12 have been fabricated from a plastic material having a hardness of between 40 to 60 durometers and which are substantially impervious to hydrocarbons and other components of the fluid contained in barrel-shaped bore 6. Cellulose acetate butyrate and polyvinyl chloride have been found to be acceptable materials for vial-plug production although cellulose acetate butyrate is preferred. Plugs having a lower durometer hardness would not generally be satisfactory as they would not be expected to retain their shape due to their relative dimensional instabiity. Plugs with higher hardness durometers could be so unyielding due to their extreme dimensional stability that, when installed, they could scratch or craze the bore 7 to an extent that a fluid-tight seal could not be permanently obtained; and, in some instances, a high hardness plug could expand the bore to a degree which would detrimentally affect the precision mounting of a vial in a level instrument or could distort the vial shape to make it unacceptably inaccurate for levelling purposes. The line seal 17 provided by plug 12 should, therefore, be fluid-tight but should not craze or deform the vial.

In selecting the resin or organic adhesive 13 to be applied as the secondary or dry-seal, the epoxy resins have been found to be reliable although they require a relatively long curing period in the absence of heat. They fulfill one of the most important requirements of a resin system in that they provide a high degree of dimensional stability and are generally impervious to fluid components contained in level vials. They also cure without significant production of heat and permit relatively little air or gas entrapment. It has been found that organic adhesives or resins which contain relatively high percentages of evaporative solvents develop a substantial degree of resin shrinkage during the curing process as well as excessive air or gas entrapment. Shrinkage can readily cause distortion of the bore portion adjacent to the plug 12 to an extent which can eventually lead to the leakage of fluid from the vial while gas entrapment can produce void in the resin which can permit leakage. While resin 13 is used as the agent for bonding plug 12 to vial 1, thereby serving as a secondary vial seal, it also serves to impart a degree of rigidity to the vial portions extending longitudinally outwardly from the vial plug 12.

After a suitable fluid or liquid 8 has been introduced into the partially sealed vial in an amount sufficient to partially fill the barrel-shaped bore 6 and to leave a void 9 which will ultimately serve as the bubble-indicator of the vial, the final closure of the remaining open end of the vial 1 is carried out. In this instance, a seal such as is shown at the top portion of the vial illustrated in FIG. 1 is employed. In sealing this end of the fluid containing vial 1, a counter-bore 20 is formed at the uppermost end of the vial. This counter-bore produces a generally annular shoulder 21 adjacent the fluid containing bore of the vial. The diameter of the counter-bore is greater than that of the adjacent bore portion.

As is best shown in FIG. 1, the fluid 8 is shown to be spaced below shoulder 21 provided by the counter-bore, with the meniscus 22 produced by the fluid 8 also being spaced below the shoulder 21. A sealing disc 23, best seen in FIGS. 3 and 4, having a diameter of a dimension sufficient to produce a firm fit between the periphery 24 thereof and the walls of the counter-bore 20 is designed for insertion therein. The disc 23 is formed with a plurality of peripherally spaced perforations 25. The diameter measured between opposed perforations 25 of the sealing disc is slightly larger than the diameter of the innermost edges of counter-bore shoulder 21.

The relationship between the extreme disc diameter and the diameter between the perforations provides a plurality of air-passages 26 which maintain continuous atmospheric communication between the void 9 below disc 23 and the atmosphere outside of the vial as the disc is inserted into the bore and until it is brought into contact with shoulder 21. These passages 26, therefore, also serve to maintain pressure equalization between the void 9 and the outside atmosphere as the sealing disc 23 is inserted into counter-bore 20. By producing this pressure equalization as the sealing disc 23 is urged into the counterbore 20, the undesirable effects of the capillary action of the liquid in the vial in combination with the pressure being exerted upon the liquid by a descending air-tight seal, which can produce flooding of the liquid 8 into the counter-bore and thereby prevent the establishment of an effective permanent seal, can be avoided by utilizing a perforated sealing disc 23.

When sealing disc 23 is properly positioned in abutting relationship with respect to shoulder 21 in counter-bore 20, a small quantity of a highly evaporative plastic solvent, such as methylethyl ketone is applied to the surfaces of sealing disc 23 which are in contact with or adjacent to surfaces of counter-bore 20 and shoulder 21. The evaporative solvent acts quickly to produce a chemical bond between the vial and the disc 23 which is substantially free from bubbles caused by gas entrapment, thereby providing an initial or primary interstitial wet seal of the vial end to hermetically seal the fluid in the bubble chamber of the vial.

The quick acting evaporative solvent used affords several significant advantages. It acts to produce a rigid and permanent hermetic bond between the vial and the disc which is particularly effective where the vial and the disc are fabricated from the same material since the material became fused to provide an essentially integral structure. The closed vial thereby forms a container which is impervious to the fluid it contains.

During the fusion of the disc and vial elements in the production of the initial interstitial seal, little, if any, heat is evolved; and, in fact, any heat which is evolved is rapidly dissipated by the cooling influence of the evaporating solvent. This is an advantage since heat evolution adjacent the fluid filled bubble chamber of the vial can lead to the production of vapor within the closed vial. The presence of such vapor during the vial sealing process can seriously affect the integrity of the seal by generating bubbles in the seal with the resultant production of an unreliable and inaccurate level vial. The minimization of heat and vapor production during the sealing process, therefore, makes possible the establishment of a sound and reliable initial wet seal.

With the relatively quick production of sound and reliable interstitial seal, the production of the final secondary seal 27 is enhanced since the commonly available, though relatively slow curing epoxies can be used. The epoxy resins, while curing at a relatively slow rate, produce a minimum of heat which is readily dissipated due to its slow production. This prevents the production of vapor within the vial, which, at this stage of manufacture, can still cause distortion of the vial and damage the seal. Also, since application of the epoxy resin to form the secondary vial seal 27 is essentially the final major manufacturing step in vial production, a quick curing resin is not essential for purposes of manufacturing efficiency and economy. However, in the development of resin systems, a subsequently developed resin or bonding agent could be used having the desired physical properties of: dimensional stability under broadly varying conditions, both during and after curing; impermeability to the fluid contained in the vial; strength and the additional characteristic of rapid curing without significant heat production.

I claim:

1. The method of hermetically sealing an open end of a level vial formed with a fluid channel in communication with an open vial end comprising forming disc supporting shoulder means on the periphery of the fluid channel in the level vial a predetermined distance from the open end thereof, introducing a fluid into the level vial to a predetermined level with respect to the disc supporting shoulder means, forming a relatively rigid disc member with at least one peripheral irregularity to provide a continuous channel at the periphery of the disc member from the top to the bottom thereof, sizing the disc member in a manner such that the diameter thereof measured through the peripheral irregularity of the disc exceeds the diameter of the channel measured across the disc supporting shoulder means, inserting the disc through the open end of the level vial and into engagement with the shoulder means in the communicating channel thereof, the irregularity of the disc member serving to maintain continuous pressure equalization on the innermost side thereof through the continuous channel of the disc irregularity during insertion of the disc member into the level vial channel and into engagement with the disc supporting shoulder means to prevent displacement of fluid in the vial, and applying means to the disc member to fuse it to the vial and to hermetically seal the opening thereof.

2. The method of claim 1, wherein the channel of the level vial is formed with a generally cylindrical configuration, the disc supporting shoulder means is a continuous radially extending annular rim, fluid is introduced into the vial to a level spaced a preselected distance below the generally cylindrical opening, the disc member is formed into a disc having a generally circular configuration having the general dimensions of the cylindrical opening, a peripheral segment is removed from the disc periphery to provide a path for continuous pressure equalization and atmospheric communication between both sides of the disc as it is inserted into the cylindrical opening, a solvent is applied to the disc after it has been positioned in predetermined relationship with respect to the fluid level of the vial, the solvent acts to liquify means on the disc sufficient to fuse the interstices of adjacent vial and disc surfaces, and the disc is permanently and hermetically sealed in the opening by the application thereover of a dimensionally stable adhesive.

3. The method of claim 2 wherein the disc is formed with a plurality of peripheral irregularities, the greatest diameter of the disc is about equal to the diameter of the cylindrical opening and the smallest diameter of the disc at an irregularity thereof is at least slightly greater than the smallest diameter of the adjacent fluid containing vial portion, whereupon during insertion of the disc into the cylindrical opening continuous pressure and atmospheric communication are maintained between the void above the fluid and the exterior of the vial until the disc is in place, and the solvent is applied to the disc to liquify a portion thereof sufficient to hermetically close the interstices provided between the vial and the disc.

4. The method of claim 1 wherein the insertion of the plug and the curing of the adhesive is carried out at a temperature and pressure level insufficient to produce vaporization of the fluid in the bubble chamber at a level which will interfere with the production of a hermetic vial seal.

References Cited

UNITED STATES PATENTS

| | | | |
|---|---|---|---|
| 2,356,211 | 8/1944 | Geier | 33—212.2 |
| 2,576,202 | 11/1951 | Wullschleger | 33—211 |
| 2,669,370 | 2/1954 | Royall | 215—47 |
| 2,750,677 | 6/1956 | Wirth | 33—211 |
| 3,061,920 | 11/1962 | Johnson | 33—212 XR |
| 3,132,983 | 5/1964 | Osborne et al. | 156—308 |
| 3,311,990 | 4/1967 | Wright | 33—211 |

LEONARD FORMAN, Primary Examiner

DENNIS A. DEARING, Assistant Examiner

U.S. Cl. X.R.

53—38; 215—47

UNITED STATES PATENT OFFICE
CERTIFICATE OF CORRECTION

Patent No. 3,491,454                                          January 27, 19

Donald E. Wright

It is certified that error appears in the above identified patent and that said Letters Patent are hereby corrected as shown below:

Column 1, line 60, "and" should read -- end --.

Signed and sealed this 29th day of December 1970.

(SEAL)
Attest:

Edward M. Fletcher, Jr.                       WILLIAM E. SCHUYLER, JR.
Attesting Officer                                      Commissioner of Patents